(12) United States Patent
Song et al.

(10) Patent No.: US 9,008,040 B2
(45) Date of Patent: Apr. 14, 2015

(54) HANDOVER METHOD, USER EQUIPMENT, AND NETWORK SIDE DEVICE

(75) Inventors: Weiwei Song, Beijing (CN); Yuhua Chen, Beijing (CN); Jing Han, Beijing (CN); Zhiyu Yan, Beijing (CN); Yinghui Yu, Beijing (CN); Xin Xiong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 531 days.

(21) Appl. No.: 13/336,760

(22) Filed: Dec. 23, 2011

(65) Prior Publication Data

US 2012/0093128 A1 Apr. 19, 2012

Related U.S. Application Data

(63) Continuation of application No. PCT/CN2010/074288, filed on Jun. 23, 2010.

(30) Foreign Application Priority Data

Jun. 23, 2009 (CN) .......................... 2009 1 0148040

(51) Int. Cl.
*H04W 4/00* (2009.01)
*H04W 36/00* (2009.01)
*H04W 36/24* (2009.01)
(Continued)

(52) U.S. Cl.
CPC .......... *H04W 36/0077* (2013.01); *H04W 36/24* (2013.01); *H04W 36/0011* (2013.01); *H04W 36/14* (2013.01); *H04W 36/08* (2013.01); *H04W 36/30* (2013.01); *H04W 72/1289* (2013.01); *H04W 88/02* (2013.01); *H04W 88/08* (2013.01)

(58) Field of Classification Search
CPC . H04W 80/04; H04W 36/18; H04W 36/0011; H04W 36/14; H04W 36/08; H04W 36/30; H04W 36/24; H04W 72/1289; H04W 88/02; H04W 88/08
See application file for complete search history.

(56) References Cited

U.S. PATENT DOCUMENTS 6,438,117 B1 8/2002 Grilli et al.
2008/0182579 A1 7/2008 Wang et al.
(Continued)

FOREIGN PATENT DOCUMENTS

CN 101064943 A 10/2007
CN 101198155 A 6/2008
(Continued)

OTHER PUBLICATIONS

Office Action issued in corresponding Chinese Patent Application No. 200910148040.X, mailed Feb. 22, 2013.
(Continued)

*Primary Examiner* — Michael J Moore, Jr.
*Assistant Examiner* — Lonnie Sweet
(74) *Attorney, Agent, or Firm* — Brinks Gilson & Lione

(57) ABSTRACT

Embodiments of the present invention disclose a handover method, User Equipment (UE), and a network side device, which can shorten a handover delay of a control plane and an interrupt delay of user plane data. A handover method includes: obtaining, by a UE, a Time Advance (TA) of a target cell before a handover; and obtaining an Uplink Grant (UL Grant) sent by the target cell; and then sending a Handover Complete message to the target cell with the TA on a resource that is corresponding to the UL Grant.

18 Claims, 10 Drawing Sheets

(51) Int. Cl.
  *H04W 36/14* (2009.01)
  *H04W 36/08* (2009.01)
  *H04W 36/30* (2009.01)
  *H04W 72/12* (2009.01)
  *H04W 88/02* (2009.01)
  *H04W 88/08* (2009.01)

(56) References Cited

U.S. PATENT DOCUMENTS

| 2008/0267131 | A1 | 10/2008 | Kangude et al. | |
|---|---|---|---|---|
| 2008/0268850 | A1* | 10/2008 | Narasimha et al. | 455/437 |
| 2009/0286541 | A1* | 11/2009 | Maheshwari et al. | 455/436 |
| 2010/0189007 | A1* | 7/2010 | Chun et al. | 370/252 |
| 2010/0232382 | A1* | 9/2010 | Gauvreau et al. | 370/329 |

FOREIGN PATENT DOCUMENTS

| CN | 101247647 A | 8/2008 |
|---|---|---|
| CN | 101370267 A | 2/2009 |
| EP | 2129147 A1 | 12/2009 |
| RU | 2007143485 A | 5/2009 |
| WO | WO 2007/149013 A1 | 12/2007 |
| WO | WO 2008/084395 A1 | 7/2008 |
| WO | WO 2008/098482 A1 | 8/2008 |

OTHER PUBLICATIONS

Office Action issued in corresponding Japanese Patent Application No. 2012-516498, mailed Feb. 26, 2013.
Office Action issued in corresponding Russian Patent Application No. 2012102000/07, mailed Jan. 29, 2013.
Office Action issued in corresponding European Patent Application No. 10791541.5, mailed Jun. 3, 2013, 5 pages.
Notice of Allowance issued in corresponding Russian Patent Application No. 2012102000/07, mailed May 28, 2013, 17 pages.
International Search Report and Written Opinion of the International Searching Authority issued in corresponding PCT Patent Application No. PCT/CN2010/074288, mailed Oct. 8, 2010.
Extended European Search Report issued in corresponding European Patent Application No. 10791541.5, mailed Jul. 5, 2012.
Office Action issued in corresponding Chinese Patent Application No. 200910148040.X, mailed May 29, 2012.
RAN WG2, "LS on LTE Latency Analysis" Release 8, Work Item LTE-L23, 3GPP TSG-RAN WG2 Meeting #58. Kobe, Japan, May 7-11, 2007. R1-072648.

* cited by examiner though the UE is detached from the source cell, the source cell still preserves all context information of the UE.

HANDOVER METHOD, USER EQUIPMENT, AND NETWORK SIDE DEVICE

CROSS-REFERENCE TO RELATED APPLICATIONS

This application is a continuation of International Application No. PCT/CN2010/074288, filed on 23 Jun. 2010, which claims priority to Chinese Patent Application No. 200910148040.X, filed on 23 Jun. 2009, both of which are hereby incorporated by reference in their entireties.

FIELD OF THE INVENTION

The present invention relates to the field of radio communication technologies, and in particular, to a handover method, User Equipment (UE), and a network side device.

BACKGROUND OF THE INVENTION

In an existing Long Term Evolution (LTE) system, when a UE is handed over between cells, a random access procedure is used to acquire uplink synchronization with a target cell.

In FIG. 1, when a source cell receives a Radio Resource Control (RRC) measurement report (Measurement Reports) from the UE, a Handover Request message is sent to a target cell, and after receiving a Handover Request ACK (Handover Request Confirm) message returned from the target cell, a Handover Command is sent to the UE. According to the Handover Command, the UE begins to be detached from the source cell, and is synchronized with the target cell. At this time, the UE completes the uplink synchronization with the target cell through the random access procedure, and obtains an Uplink Grant (UL Grant) of the target cell, and furthermore, the UE sends a Handover Complete message on a scheduling resource that is corresponding to the obtained UL Grant. The target cell performs a corresponding Hybrid Automatic Repeat Request (HARQ) ACK after correctly receiving a data block of the Handover Complete message, and meanwhile, the target cell sends a Handover Complete indication to the source cell to confirm that the handover is complete, where the Handover Complete indication may be a UE context release message.

During the implementation of the present invention, the inventor researches and finds that during a handover, performing a random access procedure of uplink synchronization causes a longer delay.

SUMMARY OF THE INVENTION

Embodiments of the present invention provide a handover method, a UE, and a network side device, which may shorten a handover delay of a control plane and an interrupt delay of user plane data.

An embodiment of the present invention provides a handover method, which includes: obtaining, by a UE, a Time Advance (TA) of a target cell before a handover; and obtaining a UL Grant sent by the target cell; and then sending a Handover Complete message to the target cell with the TA on a resource that is corresponding to the UL Grant.

Another handover method is provided, which includes: sending, by a target cell, a TA of the target cell to a UE through a source cell before a handover; and sending a UL Grant of the target cell to the UE; and then receiving a Handover Complete message that is sent by the UE with the TA on a resource that is corresponding to the UL Grant.

Another handover method is provided, which includes: obtaining, by a source cell, a TA of a target cell; and sending the TA of the target cell to a UE before a handover; and then receiving a Handover Complete indication sent by the target cell to confirm that the handover of the UE is completed.

Corresponding to the preceding method embodiments, an embodiment of the present invention provides a UE, which includes:

a TA obtaining unit, configured to obtain a TA of a target cell before a handover;

a UL Grant obtaining unit, configured to obtain a UL Grant sent by the target cell; and a sending unit, configured to send a Handover Complete message to the target cell with the TA on a resource that is corresponding to the UL Grant.

A network side device is provided, which includes:

a TA sending unit, configured to send a TA of a target cell to a UE through a source cell before a handover;

a UL Grant sending unit, configured to send a UL Grant of the target cell to the UE; and a receiving unit, configured to receive a Handover Complete message that is sent by the UE with the TA on a resource that is corresponding to the UL Grant.

Another network side device is provided, which includes:

a TA determining unit, configured to obtain a TA of a target cell;

a TA forwarding unit, configured to send the TA of the target cell to a UE before a handover; and a handover confirming unit, configured to receive a Handover Complete indication sent by the target cell to confirm that the handover of the UE is completed.

It can be seen from the technical solutions provided in the preceding embodiments of the present invention, a UE obtains a TA of a target cell before a handover, thus increasing synchronization precision after the handover, and the UE obtains a UL Grant sent by the target cell and sends a Handover Complete message to the target cell with the TA on a resource that is corresponding to the UL Grant, so that the UE can be scheduled to transmit uplink signaling and data in time, thus shortening the handover delay of the control plane and the interrupt delay of the user plane data.

BRIEF DESCRIPTION OF THE DRAWINGS

To describe the technical solutions in the embodiments of the present invention or in the prior art more clearly, the accompanying drawings required for the description of the embodiments or the prior art are briefly introduced in the following. Obviously, the accompanying drawings described in the following description are only some embodiments of the present invention, and those skilled in the art may still obtain other drawings according to these accompanying drawings without creative efforts.

DETAILED DESCRIPTION OF THE EMBODIMENTS

The technical solutions in the embodiments of the present invention are described clearly and completely in the following with reference to the accompanying drawings in the embodiments of the present invention.

Embodiment 1

Figure 1:
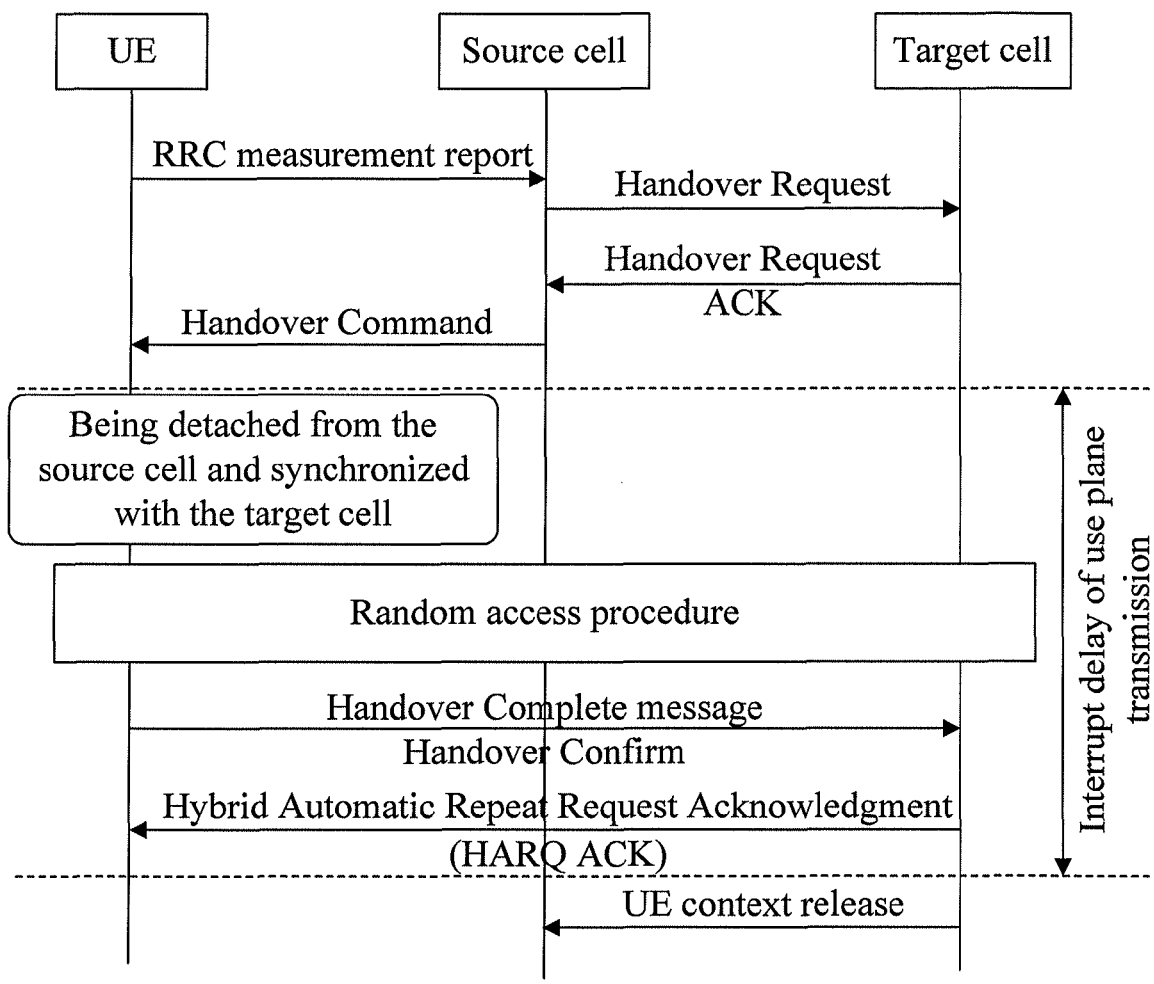
FIG. 1 is a flowchart of a handover using a random access procedure according to the prior art.
Figure 2:
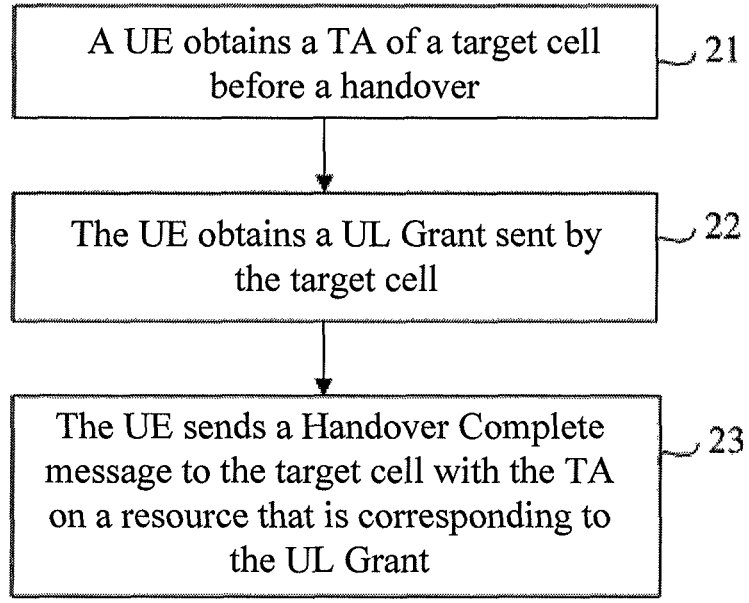
FIG. 2 is a schematic diagram of a handover method according to an embodiment of the present invention.

Referring to FIG. 2, an embodiment of the present invention provides a handover method in a scenario where no random access procedure is performed. The method includes:

Step 21: A UE obtains a TA of a target cell before a handover.

In a coordinated multi-point scenario and in a carrier aggregation scenario, an uplink signal of the UE is detected, measured, and even received. Therefore, all multiple coordinated access points or component carriers may measure the uplink signal of the UE, including a Physical Uplink Control Channel (PUCCH), a Physical Uplink Shared Channel (PUSCH), a Sounding Reference Signal (SRS), and so on, to obtain the TA (Time Advance) of the target cell of the handover. For measuring other neighboring cells that are not included in a set, if the uplink signal of the UE is also detected and measured, the same method may also be used to obtain a TA of a corresponding source cell.

Regarding how to obtain the TA of the target cell, this embodiment of the present invention gives the following five schemes.

Figure 3:
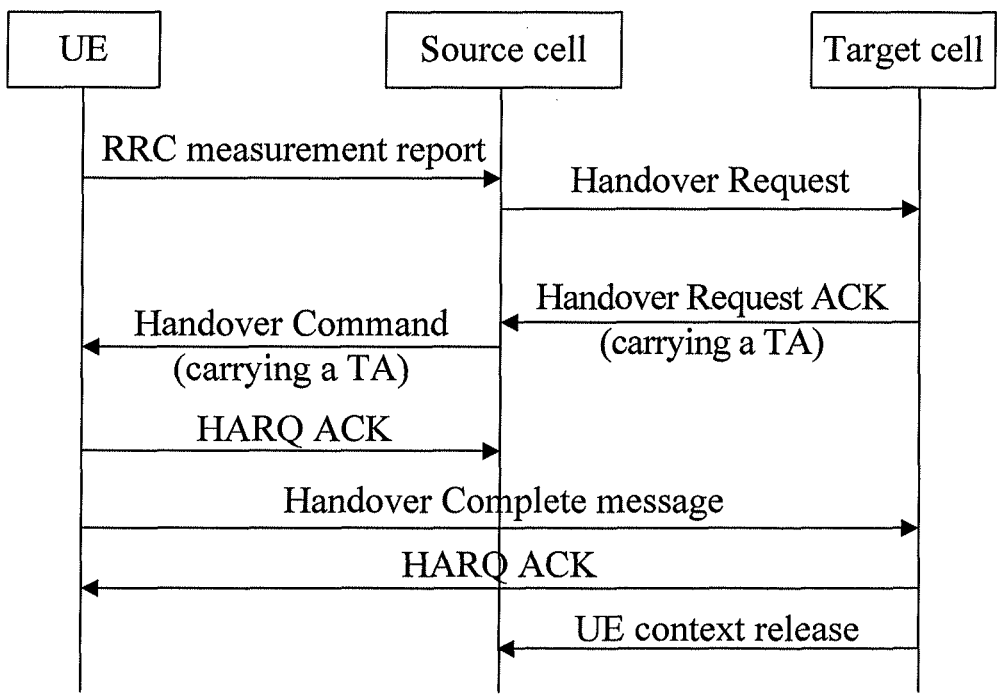
FIG. 3 is a flowchart of a method for obtaining a TA of a target cell according to an embodiment of the present invention.

Scheme 1: Referring to FIG. 3, before the handover, when the target cell sends a Handover Request ACK (Handover Request Confirm) message to a source cell, the target cell sends the TA of the target cell to the source cell; the source cell sends to a UE a Handover Command that carries a TA value of the target cell; and the UE obtains the TA of the target cell from the Handover Command. For the UE, if the TA is received in the Handover Command, the TA is updated, and otherwise, the TA is not updated and a TA value of the source cell before the handover is continued to be used. The Handover Command may be included in an RRC connection reconfiguration message.

Figure 4:
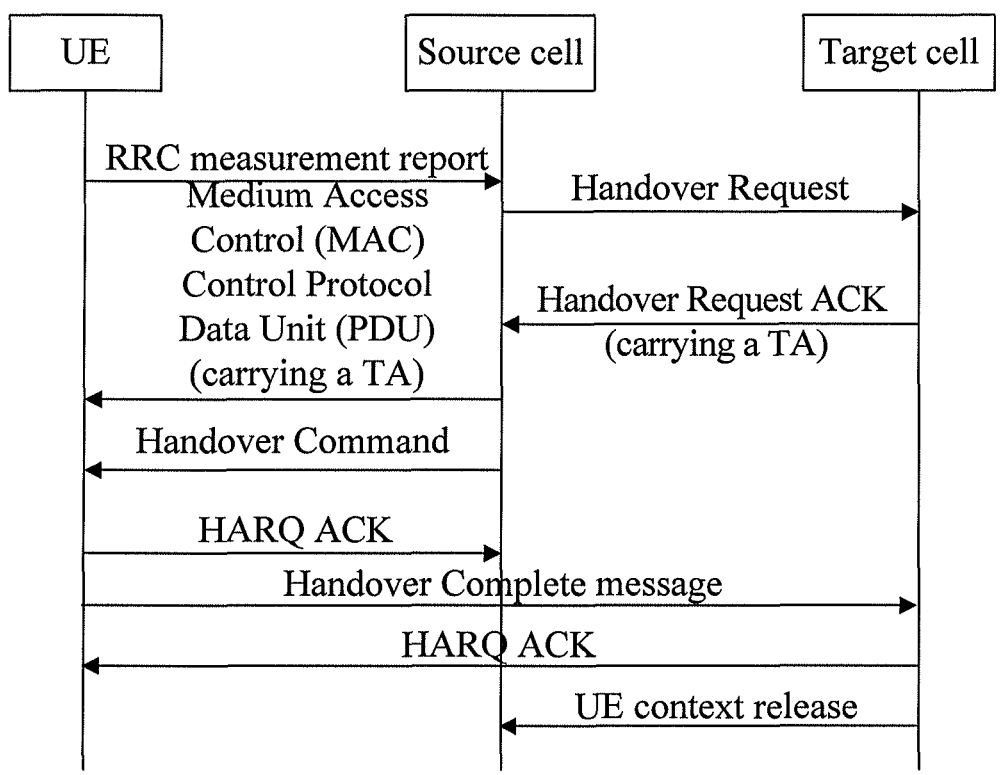
FIG. 4 is a flowchart of another method for obtaining a TA of a target cell according to an embodiment of the present invention.

Scheme 2: Referring to FIG. 4, before the handover, when the target cell sends a Handover Request ACK (Handover Request Confirm) message to a source cell, the target cell sends TA information of the target cell to the source cell, and the source cell transmits the TA to a UE through a Medium Access Control (MAC) Control Protocol Data Unit (PDU), and at the same time or after a time interval, sends a Handover Command to the UE, and the UE obtains the TA of the target cell from the PDU. The MAC Control PDU may further include a target cell identification, which is used for indicating that the TA is used in the target cell. For the UE, if the UE does not receive the PDU before the handover, the UE continues to use a TA value of the source cell before the handover.

Scheme 3: If the target cell is a coordinated scheduling cell or a cell in a carrier aggregation set, the target cell sends TA information of the target cell to a source cell in a periodic manner or in an event-triggered manner, and before the handover, the source cell sends to the UE a Handover Command message that carries a TA value of the target cell, or before sending the Handover Command, the source cell sends the TA value of the target cell to the UE, where the TA value of the target cell is carried through an MAC Control PDU.

Scheme 4: If the target cell is a coordinated scheduling cell or a cell in a carrier aggregation set, the target cell continuously or discontinuously sends a packet received by physical layer coordination to a source cell, and the source cell may calculate the TA of the target cell by decoding the packet. Before the handover, the source cell sends to a UE a Handover Command message that carries a TA value of the target cell obtained through decoding, or before sending the Handover Command, the source cell sends the TA value of the target cell to the UE, where the TA value of the target cell is carried through an MAC Control PDU.

Scheme 5: The UE may also not obtain a new TA value, but continues to use a TA value of a source cell before the handover.

Based on the preceding schemes, the UE obtains the TA of the target cell before the handover, thus increasing synchronization precision after the handover, decreasing a probability of loss of synchronization after the handover, so that a probability of performing a random access procedure because of loss of synchronization is decreased, and accordingly, a resource for a random access procedure is saved.

Step 22: The UE obtains a UL Grant sent by the target cell.

The UL Grant may be sent to the UE through a Physical Downlink Control Channel (PDCCH) of the target cell. For the UE, when receiving a Handover Command that may be included in an RRC connection reconfiguration message, after the UE completes an internal RRC connection reconfiguration, the UE begins to monitor the PDCCH of the target cell.

Regarding how to obtain the UL Grant sent by the target cell, this embodiment of the present invention also gives the following three schemes.

Figure 5:
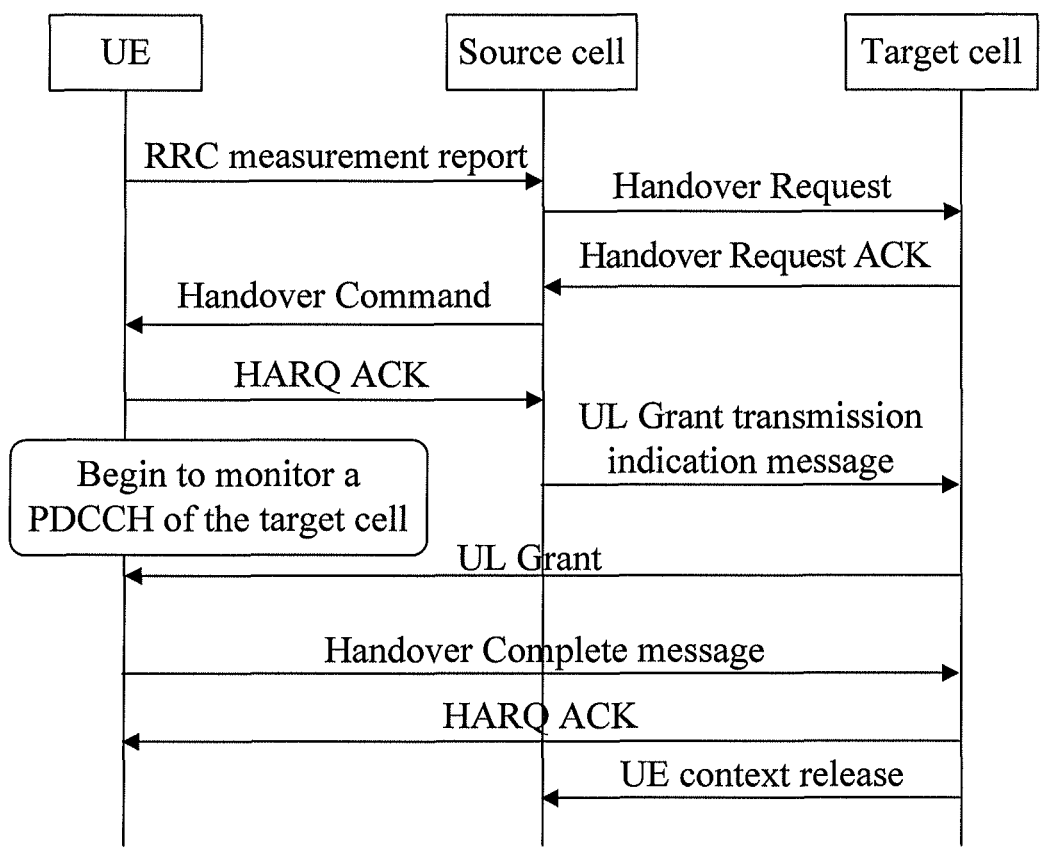
FIG. 5 is a flowchart of a method for obtaining a UL Grant according to an embodiment of the present invention.

Scheme 1: Referring to FIG. 5, for the source cell, after an HARQ ACK message that includes a handover success message and is sent by the UE is received, a UL Grant transmission indication message is sent to the target cell. The message indicates that "the UE has received the Handover Command", where the Handover Command may be included in the RRC connection reconfiguration message and sent.

For the target cell, when the UL Grant transmission indication message is received from the source cell, an uplink transmission resource is sent to the UE through the PDCCH. Considering internal processing time of the UE, the target cell may send the UL Grant to the UE after receiving the UL Grant transmission indication message from the source cell.

After receiving the Handover Command (included in the RRC connection reconfiguration message), the UE may start a timer. If the uplink transmission resource allocated by the target cell is still not received when the timer expires, a random access procedure is initiated to the target cell to reestablish an RRC connection, thus ensuring the completion of a handover process.

Figure 6:
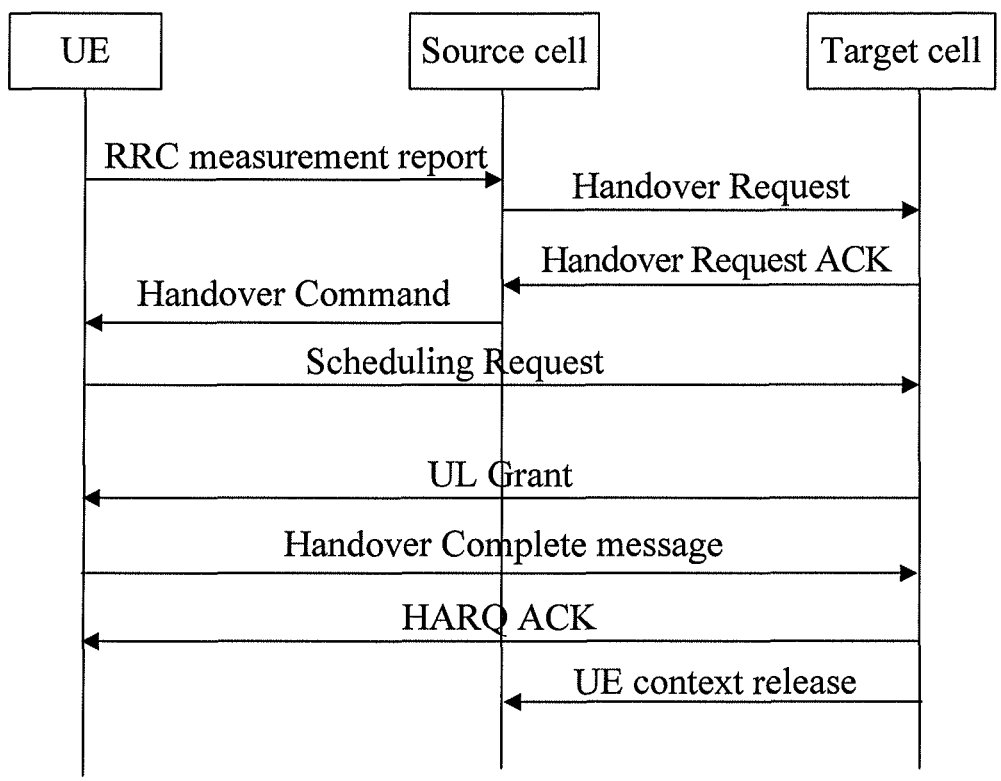
FIG. 6 is a flowchart of another method for obtaining a UL Grant according to an embodiment of the present invention.

Scheme 2: Referring to FIG. 6, for the UE, after the Handover Command (included in the RRC connection reconfiguration message) is received, a Scheduling Request (SR) is sent to the target cell through the PUCCH to request the target cell to send the UL Grant.

After receiving the SR of the UE, the target cell sends the UL Grant to the UE.

In this embodiment, a set of SR resources used for the handover is configured for the UE, where the SR uses a SR resource that is specifically configured for a handover procedure, including a location index of the SR resource, an SR period, an SR offset, and an effective duration of the SR. The SR resource used for the handover has characteristics: a short period and a short duration, so that after receiving the Handover Command, completing internal configuration of the UE, and monitoring the target cell, the UE can quickly invoke the SR resource used for the handover to send an uplink SR. After successfully sending a Handover Complete message, the UE still uses an existing SR resource.

Specifically, the following three secondary information elements are added to an SR configuration information element of the RRC connection reconfiguration message:

a. a location index of the SR resource used for the handover: sr-PUCCH-ResourceIndexforHO;

b. a period and an offset index of the SR used for the handover: sr-ConfigIndexforHO, where values of the period may be 1 ms, 2 ms, 3 ms, 4 ms, and 5 ms and a default period is 1 ms, and for the offset, the earliest time when the UE is handed over to the target cell and gets ready for sending the SR is considered; and c. an effective duration of the SR resource used for the handover: dsr-TransMaxforHO.

A specific information element structure is as follows:

```
SchedulingRequestConfig information element
SchedulingRequestConfig ::=       CHOICE {
  release NULL,
  setup    SEQUENCE {
    sr-PUCCH-ResourceIndexforHO         INTEGER (0..2047),
    sr-ConfigIndexforHO        INTEGER (0..155),
    dsr-TransMaxforHO     ENUMERATED {
        n4, n8, n16, n32, n64, spare3, spare2, spare1 }
    sr-PUCCH-ResourceIndex            INTEGER (0..2047),
    sr-ConfigIndex      INTEGER (0..155),
    dsr-TransMax       ENUMERATED {
        n4, n8, n16, n32, n64, spare3, spare2, spare1 }
  }
}
```

When the UE receives the Handover Command (included in the RRC connection reconfiguration message), or after the SR used for the handover is sent on the PUCCH, a timer may be started. If uplink resource allocation of the target cell is still not received when the timer expires, the random access procedure is initiated to the target cell to reestablish an RRC connection, thus ensuring the completion of the handover process.

Scheme 3: Definitely, the UE may also use an SR resource that is configured in the Handover Command after the handover is completed, and send the SR to the UE on the resource. After receiving the SR, the target cell sends the UL Grant to the UE through the PDCCH.

Based on the preceding schemes, the UE can quickly obtain uplink resource scheduling for bearing a Handover Complete message of a control plane, thus shortening a handover delay of the control plane.

Step 23: The UE sends a Handover Complete message to the target cell with the TA on a resource that is corresponding to the UL Grant.

In order to quickly obtain a UL Grant of user plane data and to quickly start sending the user plane data, and further to reduce interrupt time in sending the user plane data during the handover, this embodiment of the present invention provides the following three schemes.

Figure 7:
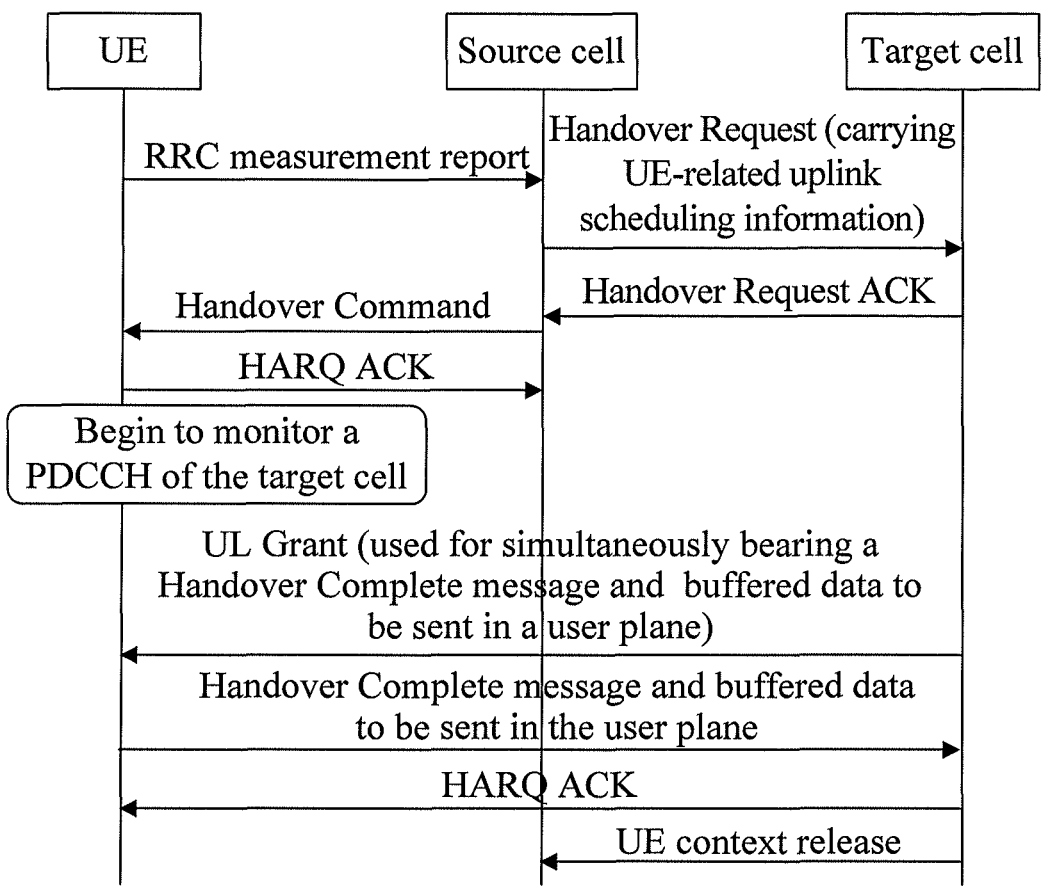
FIG. 7 is a flowchart of a method for sending user plane data according to an embodiment of the present invention.

Scheme 1: Referring to FIG. 7, before the handover, the source cell carries UE-related uplink scheduling information through a Handover Request message, for example, a Buffer Status Report (BSR) of each logical channel group, where the BSR is recently reported by the UE, so that the target cell knows in advance related information about uplink scheduling that is needed to be performed on the UE. In the handover, after the UE completes a reconfiguration in the Handover Command and is handed over to the target cell, when the target cell sends a first UL Grant, not only a size of the Handover Complete message is considered, but also a size of other uplink buffered data to be sent is considered, and enough grants are allocated, where the allocated UL Grant may be used for simultaneously bearing the Handover Complete message and the buffered data to be sent in the user plane, so that the UE sends the buffered data to be sent in the user plane together with the Handover Complete message.

Figure 8:
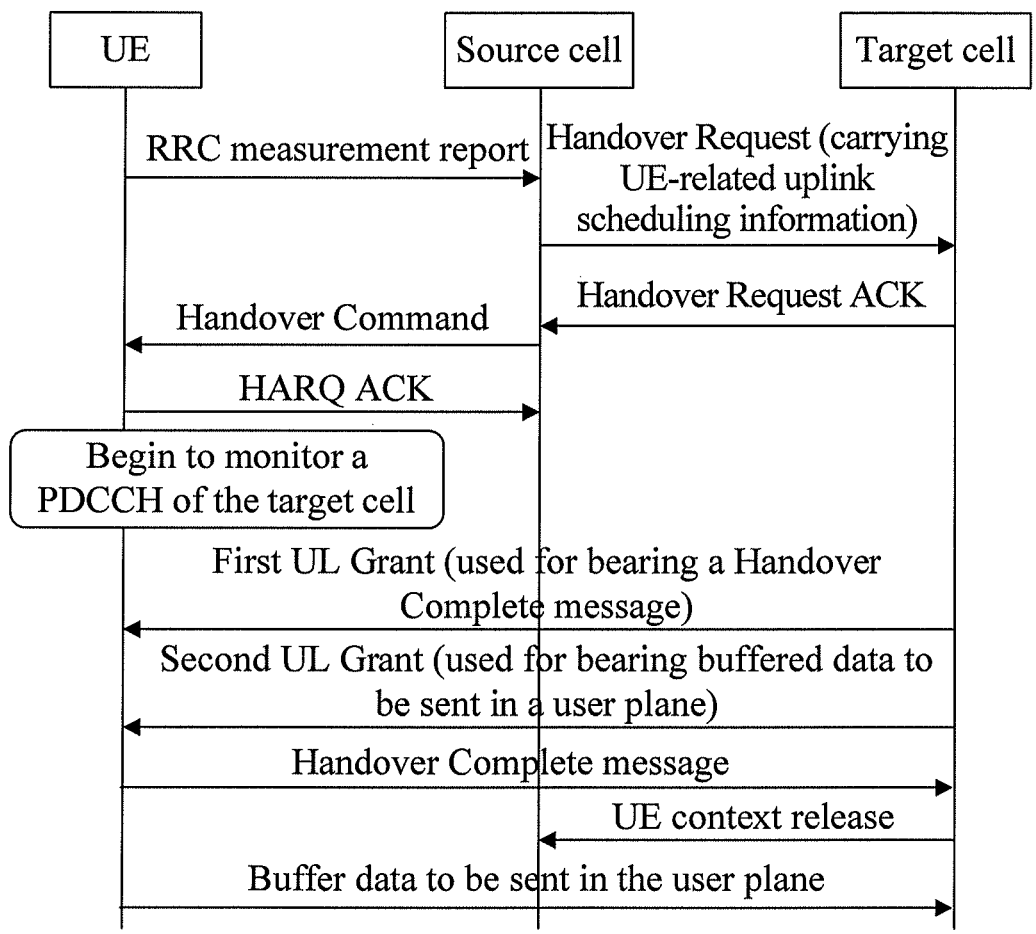
FIG. 8 is a flowchart of another method for sending user plane data according to an embodiment of the present invention.

Scheme 2: Referring to FIG. 8, before the handover, the source cell carries UE-related uplink scheduling information through a Handover Request message, for example, a BSR of each logical channel group, where the BSR is recently reported by the UE, so that the target cell knows in advance relevant information about uplink scheduling that is needed to be performed on the UE. In the handover, when the UE completes a reconfiguration in the Handover Command and is handed over to the target cell, the target cell sends UL Grants twice consecutively, where a first UL Grant (UL Grant1) is used for bearing the Handover Complete message, and a second UL Grant (UL Grant2) is used for bearing the buffered data to be sent in the user plane. After the target cell sends the UL Grant1, an eNB does not need to wait for the completion of signaling interaction and also does not need to wait for the UE to report the relevant information about the uplink scheduling, and the eNB may send the UL Grant2 to the UE according to the uplink scheduling information reported by the source cell, and the UE sends the buffered data to be sent in the user plane on the UL Grant2 and begins uplink transmission in the user plane.

Based on the preceding two schemes for sending user plane data, because sending of the user plane data can be restored without waiting for the completion of uplink and downlink RRC signaling interaction, interrupt time in user plane data transmission is further reduced.

Scheme 3: After completing the handover, the UE reports relevant information about uplink scheduling; the target cell sends a relevant grant to the UE only after receiving the uplink scheduling information; and the UE sends user plane data on the grant.

With the handover method provided in this embodiment of the present invention, the UE obtains the TA of the target cell before the handover, thus increasing synchronization precision after the handover; and the UE obtains the UL Grant sent by the target cell, and sends the Handover Complete message to the target cell with the TA on the resource that is corresponding to the UL Grant, so that the UE can be scheduled to transmit uplink signaling and data in time, and therefore, the handover delay of the control plane and the interrupt delay of the user plane data are shortened.

Embodiment 2

Figure 9:
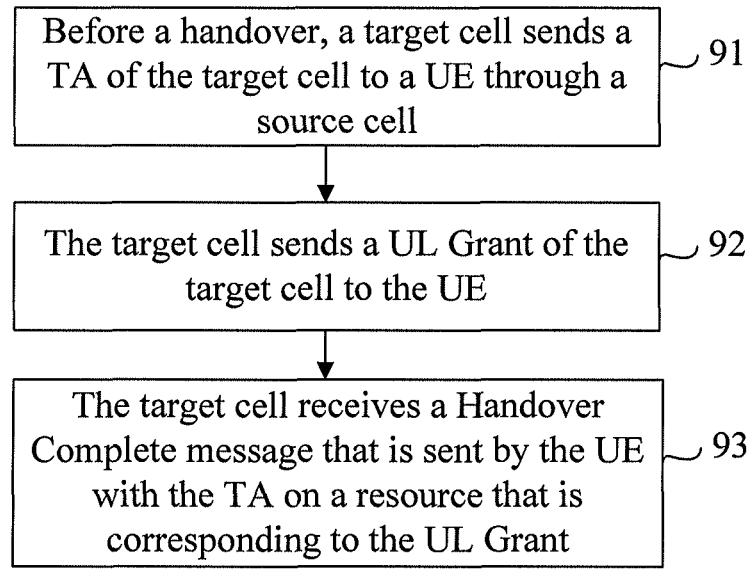
FIG. 9 is a schematic diagram of another handover method according to an embodiment of the present invention.

Corresponding to the preceding handover method embodiment, this embodiment of the present invention provides another handover method. Referring to FIG. 9, the method includes:

Step 91: Before a handover, a target cell sends a TA of the target cell to a UE through a source cell.

Step 92: The target cell sends a UL Grant of the target cell to the UE.

Step 93: The target cell receives a Handover Complete message that is sent by the UE with the TA on a resource that is corresponding to the UL Grant.

As described in the preceding method embodiment, the following scheme may be used for the target cell to send the TA of the target cell to the UE through the source cell before the handover.

The target cell sends to the source cell a Handover Request ACK message that carries the TA of the target cell, so that the source cell sends to the UE a Handover Command that carries the TA of the target cell according to the Handover Request ACK message; or, so that the source cell sends the TA of the target cell to the UE through an MAC Control PDU according to the Handover Request ACK message.

The target cell may send the UL Grant of the target cell to the UE by using the following schemes:

Scheme 1: The target cell sends the UL Grant to the UE according to a UL Grant transmission indication message, where the UL Grant transmission indication message is sent by the source cell to the target cell after the source cell receives an HARQ ACK message from the UE, and is used for indicating that "the UE has received the Handover Command"; or Scheme 2: The target cell sends the UL Grant to the UE according to an SR, where the SR is sent by the UE; and the SR uses an SR resource that is configured specifically for a handover process, or the SR uses an SR resource that is configured in the Handover Command after the handover is completed.

Furthermore, in the schemes for the target cell to send the UL Grant of the target cell to the UE, the following preferred scheme may also be used:

The target cell sends the UL Grant of the target cell to the UE according to UE-related uplink scheduling information, where:

the UE-related uplink scheduling information is carried in a Handover Request message that is sent by the source cell to the target cell;

the UL Grant is a UL Grant sent by the target cell to the UE once, and a resource that is corresponding to this UL Grant is used for simultaneously bearing the Handover Complete message and buffered data to be sent in a user plane; or, the UL Grant is UL Grants sent by the target cell to the UE twice consecutively, where a resource that is corresponding to a first UL Grant is used for bearing the Handover Complete message, and a resource that is corresponding to a second UL Grant is used for bearing the buffered data to be sent in the user plane.

With the handover method provided in this embodiment of the present invention, the target cell sends the TA of the target cell to the UE through the source cell before the handover, thus increasing synchronization precision of the UE after the handover; the target cell sends the UL Grant of the target cell to the UE and receives the Handover Complete message that is sent by the UE with the TA on the resource that is corresponding to the UL Grant, so that the UE can be scheduled to transmit uplink signaling and data in time, and therefore, a handover delay of a control plane and an interrupt delay of user plane data are shortened.

Embodiment 3

Figure 10:
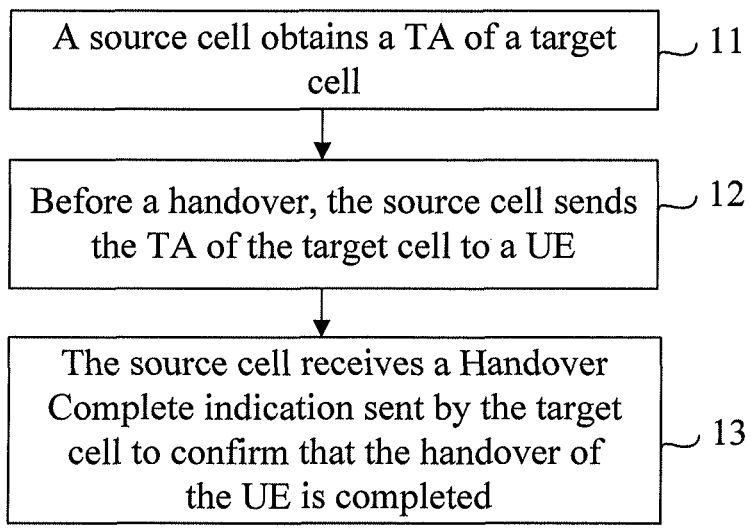
FIG. 10 is a schematic diagram of another handover method according to an embodiment of the present invention.

Corresponding to the preceding handover method embodiment, this embodiment of the present invention provides another handover method. Referring to FIG. 10, the method includes:

Step 11: A source cell obtains a TA of a target cell.

Step 12: Before a handover, the source cell sends the TA of the target cell to a UE.

Step 13: The source cell receives a Handover Complete indication sent by the target cell to confirm that the handover of the UE is completed.

As described in the preceding method embodiment, the following schemes may be used for the source cell to obtain the TA of the target cell.

Scheme 1: The source cell obtains the TA of the target cell from a Handover Request ACK message sent by the target cell; or Scheme 2: The source cell receives the TA of the target cell sent by the target cell in a perioc manner or in an event-triggered manner; or Scheme 3: The source cell calculates the TA of the target cell according to decoding of a packet that is sent by the target cell.

Before the handover, the source cell may send the TA of the target cell to the UE by using the following schemes:

Scheme 1: The source cell sends a Handover Command to the UE, where the Handover Command carries the TA of the target cell; or Scheme 2: The source cell sends an MAC Control PDU to the UE, where the MAC Control PDU carries the TA of the target cell; or Scheme 3: The source cell sends a TA of the source cell to the UE, so that the UE uses the TA of the source cell as the TA of the target cell.

For the source cell, the handover method provided in this embodiment further includes: Before the handover, the source cell sends a Handover Request to the target cell, where the Handover Request carries UE-related uplink scheduling information, for example, a BSR of each logical channel group, where the BSR is recently reported by the UE, so that the target cell knows in advance relevant information about uplink scheduling that is needed to be performed on the UE. In the handover, after the UE completes a reconfiguration in the Handover Command and is handed over to the target cell, the target cell sends a UL Grant of the target cell to the UE according to the UE-related uplink scheduling information, where the UL Grant may be a UL Grant sent by the target cell to the UE once, and a resource that is corresponding to this UL Grant is used for simultaneously bearing the Handover Complete message and buffered data to be sent in a user plane; or, the UL Grant may be UL Grants sent by the target cell to the UE twice consecutively, where a resource that is corresponding to a first UL Grant is used for bearing the Handover Complete message, and a resource that is corresponding to a second UL Grant is used for bearing the buffered data to be sent in the user plane.

With the handover method provided in this embodiment of the present invention, the source cell obtains the TA of the target cell, and before the handover, sends the TA of the target cell to the UE, thus increasing synchronization precision of the UE after the handover; and the source cell sends to the target cell the Handover Request that carries the UE-related uplink scheduling information, so that the UE can send the Handover Complete message with the TA on the resource that is corresponding to the UL Grant, and be scheduled to transmit uplink signaling and data in time, and therefore, a handover delay of a control plane and an interrupt delay of user plane data are shortened.

Embodiment 4

Figure 11:
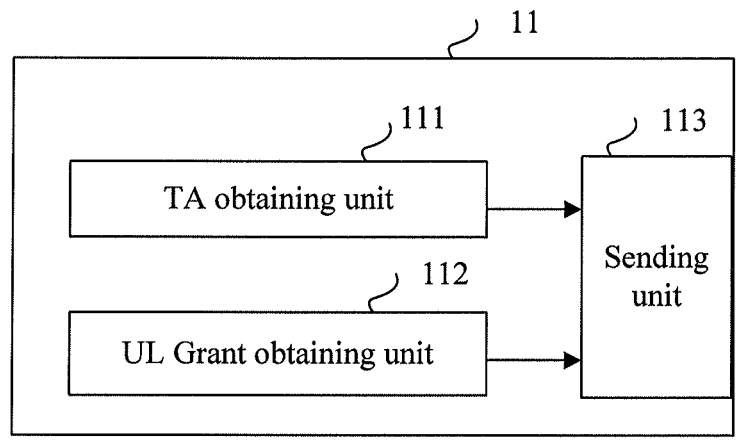
FIG. 11 is a schematic diagram of a function structure of a UE according to an embodiment of the present invention.

Based on the preceding method embodiment of the UE, a UE 11 provided in an embodiment of the present invention, referring to FIG. 11, includes:

a TA obtaining unit 111, configured to obtain a TA of a target cell before a handover;

a UL Grant obtaining unit 112, configured to obtain a UL Grant sent by the target cell; and a sending unit 113, configured to send a Handover Complete message to the target cell with the TA on a resource that is corresponding to the UL Grant.

The TA obtaining unit 111 includes any one of the following modules:

a first TA obtaining module, configured to obtain the TA of the target cell from a Handover Command sent by a source cell;

a second TA obtaining module, configured to obtain the TA of the target cell from an MAC Control PDU sent by the source cell; and a third TA obtaining module, configured to obtain a TA of the source cell before the handover as the TA of the target cell.

Before the handover, when the target cell sends a Handover Request ACK message to the source cell, the target cell sends the TA of the target cell to the source cell, and the source cell either sends a Handover Command that carries a TA value of the target cell to the UE, or transmits the TA to the UE through an MAC PDU. For the UE, if the TA of the target cell is obtained from the first TA obtaining module, the TA is updated, and otherwise, the TA is not updated and a TA value of the source cell before the handover is continued to be used; and if the TA of the target cell is obtained from the second TA obtaining module, the TA is updated, and otherwise, the TA is not updated and the TA value of the source cell is continued to be used; or, the UE directly uses the TA of the source cell before the handover as the TA of the target cell, where the TA of the source cell is obtained by the third TA obtaining module.

The UL Grant obtaining unit 112 includes any one of the following modules:

a first UL Grant obtaining module, configured to send an HARQ ACK message to the source cell after receiving the Handover Command, so that the source cell sends a UL Grant transmission indication message to the target cell according to the HARQ ACK message, and receives a UL Grant sent by the target cell according to the UL Grant transmission indication message;

a second UL Grant obtaining module, configured to send an SR to the target cell after receiving the Handover Command from the source cell, and receive a UL Grant sent by the target cell according to the SR, where the SR uses an SR resource that is specifically configured for a handover process; and a third UL Grant obtaining module, configured to send an SR to the target cell after receiving the Handover Command from the source cell, and receive the UL Grant sent by the target cell according to the SR, where the SR uses an SR resource that is configured in the Handover Command after the handover is completed.

The UL Grant may be sent to the UE through a PDCCH of the target cell. For the UE, when receiving a Handover Command that is included in an RRC connection reconfiguration message, after the UE completes an internal RRC connection reconfiguration, the UE begins to monitor a PDCCH of the source cell and the PDCCH of the target cell simultaneously.

One scheme is that when receiving a UL Grant transmission indication message from the source cell, where the UL Grant transmission indication message is used for indicating that "the UE has received the Handover Command", the target cell sends an uplink resource to the UE through the PDCCH. Meanwhile, considering internal processing time of the UE, the target cell may send the UL Grant to the UE after a period of time when receiving the UL Grant transmission indication message from the source cell, and the UE receives the UL Grant sent by the target cell through the first UL Grant obtaining module.

Another scheme is that after receiving the Handover Command (included in the RRC connection reconfiguration message), the UE sends an SR to the target cell on the PUCCH, where the SR either uses the SR resource that is specifically configured for the handover process or uses the SR resource that is configured in the Handover Command after the handover is completed. After receiving the SR of the UE, the target cell sends the UL Grant to the UE, and at this time, the UE receives the UL Grant sent by the target cell through the second UL Grant obtaining module or the third UL Grant obtaining module.

In this scheme, the SR sent by the UE to the target cell may be sent to the eNB by using the SR resource that is configured for the UE in the Handover Command after the UE is handed over to the target cell, and after receiving the SR, the eNB sends the UL Grant to the UE; and the SR resource that is specifically configured for the handover process may also be used, so that the UE can quickly invoke the SR resource to send an uplink SR after the UE is handed over to the target cell.

Specifically, the following three secondary information elements are added to an SR configuration information element of the RRC connection reconfiguration message:

a. a location index of the SR resource used for the handover: sr-PUCCH-ResourceIndexforHO;

b. a period and an offset index of the SR used for the handover: sr-ConfigIndexforHO, where values of the period may be 1 ms, 2 ms, 3 ms, 4 ms, and 5 ms and a default period is 1 ms, and for the offset, the earliest time when the UE is handed over to the target cell and gets ready for sending the SR is considered; and c. an effective duration of the SR resource used for the handover: dsr-TransMaxforHO.

A specific information element structure is as follows:

```
SchedulingRequestConfig information element
SchedulingRequestConfig ::=        CHOICE {
  release NULL,
  setup    SEQUENCE {
    sr-PUCCH-ResourceIndexforHO         INTEGER (0..2047),
    sr-ConfigIndexforHO        INTEGER (0..155),
    dsr-TransMaxforHO     ENUMERATED {
            n4, n8, n16, n32, n64, spare3, spare2, spare1}
    sr-PUCCH-ResourceIndex           INTEGER (0..2047),
    sr-ConfigIndex     INTEGER (0..155),
    dsr-TransMax       ENUMERATED {
            n4, n8, n16, n32, n64, spare3, spare2, spare1}
```

```
    }
}
```

With the UE provided in this embodiment of the present invention, the TA of the target cell is obtained before the handover through the TA obtaining unit 111, thus increasing synchronization precision after the handover; the UL Grant sent by the target cell is obtained through the UL Grant obtaining unit 112, and the Handover Complete message is sent by the sending unit 113 to the target cell with the TA on the resource that is corresponding to the UL Grant, so that the UE can be scheduled to transmit uplink signaling and data in time, thus shortening a handover delay of a control plane and an interrupt delay of user plane data.

Embodiment 5

Figure 12:
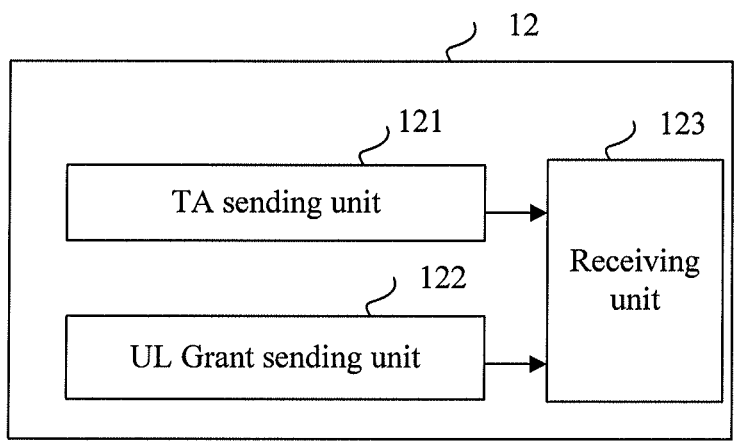
FIG. 12 is a schematic diagram of a function structure of a network side device according to an embodiment of the present invention.

Based on the preceding method embodiment of the target cell, a network side device 12 provided in an embodiment of the present invention, referring to FIG. 12, includes:

a TA sending unit 121, configured to send a TA of a target cell to a UE through a source cell before a handover;

a UL Grant sending unit 122, configured to send a UL Grant of the target cell to the UE; and a receiving unit 123, configured to receive a Handover Complete message and buffered data to be sent in a user plane that are sent by the UE with the TA on a resource that is corresponding to the UL Grant.

The UL Grant sending unit 122 includes any one of the following modules:

a first UL Grant sending module, configured to send the UL Grant to the UE according to a UL Grant transmission indication message, where the UL Grant transmission indication message is sent by the source cell to the target cell after the source cell receives an HARQ ACK message from the UE, and is used for indicating that "the UE has received a Handover Command";

a second UL Grant sending module, configured to send the UL Grant to the UE according to an SR, where the SR is sent by the UE, and the SR uses an SR resource that is configured specifically for a handover process, or the SR uses an SR resource that is configured in the Handover Command after the handover is completed.

In order to quickly obtain a UL Grant of user plane data and to quickly start sending the user plane data, and further to reduce interrupt time in sending the user plane data during the handover, a preferred scheme is:

Before the handover, the source cell carries UE-related uplink scheduling information through a Handover Request message, for example, a BSR that is recently reported by the UE, so that the target cell knows in advance relevant information about uplink scheduling that is needed to be performed on the UE. In the handover, after the UE completes a reconfiguration in the Handover Command and is handed over to the target cell, or the target cell sends and allocates enough UL Grants to the UE once, a resource that is corresponding to this allocated UL Grant is used for simultaneously bearing the Handover Complete message and uplink buffered data to be sent, so that the UE sends other service data together with the Handover Complete message. Alternatively, the target cell sends UL Grants to the UE twice consecutively, where a resource that is corresponding to a first UL Grant is used for bearing the Handover Complete message, and a resource that is corresponding to a second UL Grant is used for bearing the uplink buffered data to be sent. When the target cell sends the first UL Grant, an eNB does not need to wait for the completion of signaling interaction and also does not need to wait for the UE to report the relevant information about the uplink scheduling, and then the eNB may send the second UL Grant of other uplink buffered data to be sent according to uplink scheduling information that is obtained by the source cell, and starts uplink transmission in a user plane.

In this way, sending of the user plane data can be restored without waiting for the completion of uplink and downlink RRC signaling interaction, so that interrupt time in user plane data transmission is further reduced.

With the network side device provided in this embodiment of the present invention, the TA sending unit 121 sends the TA of the target cell to the UE through the source cell before the handover, thus increasing synchronization precision of the UE after the handover; the UL Grant sending unit 122 sends the UL Grant of the target cell to the UE, and the receiving unit 123 receives the Handover Complete message sent by the UE with the TA on the resource that is corresponding to the UL Grant, so that the UE can be scheduled to transmit uplink signaling and data in time, thus shortening a handover delay of a control plane and an interrupt delay of user plane data.

Embodiment 6

Figure 13:
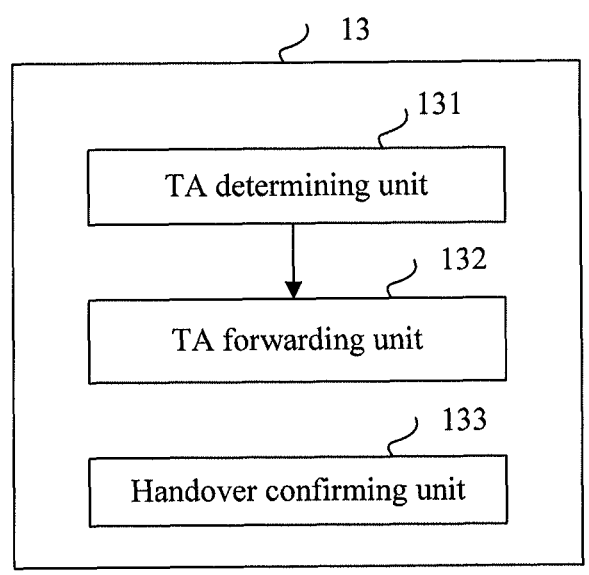
FIG. 13 is a schematic diagram of a function structure of another network side device according to an embodiment of the present invention.

Based on the preceding method embodiment of the source cell, another network side device 13 provided in an embodiment of the present invention, referring to FIG. 13, includes:

a TA determining unit 131, configured to obtain a TA of a target cell;

a TA forwarding unit 132, configured to send the TA of the target cell to a UE before a handover; and a handover confirming unit 133, configured to receive a Handover Complete indication sent by the target cell to confirm that the handover of the UE is completed.

The TA determining unit 131 includes any one of the following modules:

a first TA determining module, configured to obtain the TA of the target cell from a Handover Request ACK message that is sent by the target cell;

a second TA determining module, configured to receive the TA of the target cell, where the TA of the target cell is sent by the target cell in a periodic manner or in an event-triggered manner; and a third TA determining module, configured to calculate the TA of the target cell according to decoding of a packet that is sent by the target cell.

The TA forwarding unit 132 includes any one of the following modules:

a first TA forwarding unit, configured to send a Handover Command to the UE, where the Handover Command carries the TA of the target cell;

a second TA forwarding unit, configured to send an MAC Control PDU to the UE, where the MAC Control PDU carries the TA of the target cell; and a third TA forwarding unit, configured to send a TA of a source cell to the UE, so that the UE uses the TA of the source cell as the TA of the target cell.

How the source cell obtains the TA of the target cell and how the TA of the target cell is sent to the UE before the handover may be made reference to the preceding method embodiments, which are not further described here.

With the network side device provided in this embodiment of the present invention, the source cell obtains the TA of the target cell through the TA determining unit 131, and the TA forwarding unit 132 sends the TA of the target cell to the UE before the handover, thus increasing synchronization precision of the UE after the handover, so that the UE can send the Handover Complete message with the TA on the resource that is corresponding to the UL Grant, and be scheduled to transmit uplink signaling and data in time, and therefore, a handover delay of a control plane and an interrupt delay of user plane data are shortened.

Those skilled may be further aware that each exemplary unit and implementation step that are described in the embodiments disclosed in this specification can be implemented by electronic hardware, computer software, or a combination of the two. To clearly describe interchangeability of hardware and software, exemplary components and steps are generally described in the preceding description according to functions. Whether these functions are implemented by hardware or software depends upon a constraint condition of specific application and design of the technical solutions. Those skilled may implement the described functions by using different methods for each specific application, but this implementation should not be construed as a departure from the scope of the present invention.

The method steps described in the embodiments disclosed in this specification may be implemented with hardware, a software module that is executed by a processor, or a combination of the two. The software module may be disposed in a Random Access Memory (RAM), a memory, a Read Only Memory (ROM), an electrically programmable ROM, an electrically erasable programmable ROM, a register, a hard disk, a removable disk, a CD-ROM, or any other form of storage medium.

The preceding specific embodiments are not intended to limit the present invention, and for those skilled in the art, any modification, equivalent replacement, and improvement made without departing from the principle of the present invention shall all be included in the protection scope of the present invention.

What is claimed is:

1. A handover method, comprising:
   obtaining, by a User Equipment (UE), a Time Advance (TA) of a target cell before a handover;
   obtaining, by the UE, an Uplink Grant (UL Grant) sent by the target cell, wherein the UL Grant is sent after the UE obtaining the TA, wherein the obtaining of the UL Grant sent by the target cell, comprising:
      sending, by the UE, a Hybrid Automatic Repeat Request (HARQ) Acknowledgment (ACK) message to a source cell after receiving a Handover Command, so that the source cell sends a UL Grant transmission indication message to the target cell according to the HARQ ACK message; and
      receiving, by the UE, the UL Grant that is sent by the target cell according to the UL Grant transmission indication message; and
   sending, by the UE, a Handover Complete message to the target cell with the TA on a resource that is corresponding to the UL Grant.

2. The handover method according to claim 1, wherein the obtaining, by the UE, a TA of a target cell before a handover comprises:
   obtaining, by the UE, the TA of the target cell from a Handover Command sent by a source cell.

3. The handover method according to claim 1, wherein the obtaining, by the UE, a TA of a target cell before a handover comprises:
   obtaining, by the UE, the TA of the target cell from a Medium Access Control (MAC) Control Protocol Data Unit (PDU) sent by the source cell.

4. The handover method according to claim 1, wherein the obtaining, by the UE, a TA of a target cell before a handover comprises:
   obtaining, by the UE, a TA of the source cell before the handover as the TA of the target cell.

5. The handover method according to claim 1, wherein the obtaining, by the UE, a UL Grant sent by the target cell comprises:
   sending, by the UE, a Scheduling Request (SR) to the target cell after receiving the Handover Command from the source cell, wherein the SR uses an SR resource that is specifically configured for a handover process, or the SR uses an SR resource that is configured in the Handover Command after the handover is completed; and receiving, by the UE, the UL Grant that is sent by the target cell according to the SR.

6. A handover method, comprising:
   obtaining, by a source cell, a Time Advance (TA) of a target cell;
   sending, by the source cell, the TA of the target cell to User Equipment (UE) before a handover;
   receiving, by the source cell, a UL Grant from the target cell which takes place after the UE receiving the TA from the source cell, and forwarding by the source cell, the UL Grant to the UE, wherein the obtaining of the UL Grant sent by the target cell, comprising:
      sending, by the UE, a Hybrid Automatic Repeat Request (HARQ) Acknowledgment (ACK) message to a source cell after receiving a Handover Command, so that the source cell sends a UL Grant transmission indication message to the target cell according to the HARQ ACK message; and
      receiving, by the UE, the UL Grant that is sent by the target cell according to the UL Grant transmission indication message; and
   sending, by the UE, a Handover Complete message to the target cell with the TA on a resource that is corresponding to the UL Grant;
   receiving, by the source cell, a Handover Complete indication sent by the target cell to confirm that the handover of the UE is completed.

7. The handover method according to claim 6, wherein the obtaining, by the source cell, a TA of a target cell comprises:
   obtaining, by the source cell, the TA of the target cell from a Handover Request ACK message that is sent by the target cell.

8. The handover method according to claim 6, wherein the obtaining, by the source cell, a TA of a target cell comprises:
   receiving, by the source cell, the TA of the target cell, wherein the TA of the target cell is sent by the target cell in a periodic manner or in an event-triggered manner.

9. The handover method according to claim 6, wherein the obtaining, by the source cell, a TA of a target cell comprises:
   calculating, by the source cell, the TA of the target cell according to decoding of a packet that is sent by the target cell.

10. The handover method according to claim 6, wherein the sending, by the source cell, the TA of the target cell to a UE before a handover comprises:
    sending, by the source cell, a Handover Command to the UE, wherein the Handover Command carries the TA of the target cell.

11. The handover method according to claim 6, wherein the sending, by the source cell, the TA of the target cell to a UE before a handover comprises:

sending, by the source cell, a Medium Access Control (MAC) Control Protocol Data Unit (PDU) to the UE, wherein an MAC Control PDU carries the TA of the target cell.

12. The handover method according to claim 6, wherein the sending, by the source cell, the TA of the target cell to a UE before a handover comprises:
sending, by the source cell, a TA of a source cell to the UE, so that the UE uses the TA of the source cell as the TA of the target cell.

13. The handover method according to claim 6, further comprising:
sending, by the source cell, a Handover Request to the target cell, wherein the Handover Request carries UE-related uplink scheduling information.

14. User Equipment (UE), comprising:
a Time Advance (TA) obtaining unit, configured to obtain a TA of a target cell before a handover;
an Uplink Grant (UL Grant) obtaining unit, configured to obtain a UL Grant sent by the target cell after the UE obtaining the TA from the target cell, wherein the UL Grant obtaining unit comprises:
a first UL Grant obtaining module, configured to send a Hybrid Automatic Repeat Request (HARQ) Acknowledgment (ACK) message to a source cell after receiving a Handover Command, so that the source cell sends a UL Grant transmission indication message to the target cell according to the HARQ ACK message, and receives the UL Grant that is sent by the target cell according to the UL Grant transmission indication message; and
a sending unit, configured to send a Handover Complete message to the target cell with the TA on a resource that is corresponding to the UL Grant.

15. The UE according to claim 14, wherein the TA obtaining unit comprises:
a first TA obtaining module, configured to obtain the TA of the target cell from a Handover Command sent by a source cell.

16. The UE according to claim 14, wherein the TA obtaining unit comprises:
a second TA obtaining module, configured to obtain the TA of the target cell from a Medium Access Control (MAC) Control Protocol Data Unit (PDU) sent by the source cell.

17. The UE according to claim 14, wherein the TA obtaining unit comprises:
a third TA obtaining module, configured to obtain a TA of the source cell before the handover as the TA of the target cell.

18. The UE according to claim 14, wherein the UL Grant obtaining unit comprises:
a second UL Grant obtaining module, configured to send a Scheduling Request (SR) to the target cell after receiving the Handover Command from the source cell, and receive the UL Grant that is sent by the target cell according to the SR, wherein the SR uses an SR resource that is specifically configured for a handover process.

* * * * *